(12) United States Patent
Butcher et al.

(10) Patent No.: US 6,355,889 B1
(45) Date of Patent: Mar. 12, 2002

(54) METHOD AND APPARATUS FOR LINKING ELECTRONIC INK TO ELECTRONIC PERSONAL INFORMATION SYSTEMS

(75) Inventors: Simon Butcher, Woburn, MA (US); John P. Karidis, Ossining, NY (US); Sreenivasulu Kesavarapu, Tarrytown, NY (US); Scott Lekuch, New York, NY (US); Toby Maners, Boca Raton, FL (US); James Randal Moulic, Poughkeepsie; Bengt-Olaf Schneider, Yorktown Heights, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/604,900

(22) Filed: Jun. 28, 2000

(51) Int. Cl.[7] .......................... G06K 11/06; G08C 21/00
(52) U.S. Cl. ..................... 178/18.03; 345/173
(58) Field of Search ................ 345/173–179, 345/302, 328, 475, 723, 724; 178/18.03–18.11; 707/3, 102, 541

(56) References Cited

U.S. PATENT DOCUMENTS 5,535,063 A  *  7/1996  Lamming ................... 345/302
5,710,916 A  *  1/1998  Barbara et al. ............... 707/3
5,786,814 A  *  7/1998  Moran et al. ................ 345/328
5,970,455 A  * 10/1999  Wilcox et al. ............... 704/270
5,986,655 A  * 11/1999  Chiu et al. .................. 345/302

* cited by examiner

Primary Examiner—Richard Hjerpe
Assistant Examiner—M. Fatahiyar
(74) Attorney, Agent, or Firm—Paul J. Otterstedt, Esq.; Harrington & Smith, LLP

(57) ABSTRACT

Disclosed is a method and an apparatus, as well as a computer program, for associating digitizer tablet stroke samples with entries in an electronic personal information management (PIM) tool, such as an electronic organizer or an electronic calendar. A stroke database has a plurality of time stamped stroke entries, and a PIM database has a plurality of entries each having a time associated therewith. A controller searches at least one of the stroke database and the PIM database to locate corresponding entries in each database that indicate that a particular one of the stroke entries was created at a time that corresponds to a particular one of the PIM database entries. The controller is responsive to the search being successful for forming a link between the stroke entry and the PIM database entry for enabling corresponding stroke information to be visualized in association with the particular one of the PIM database entries. In accordance with these teachings, and by example, a user is enabled to recall and view handwritten notes and other information that were made during a meeting that corresponds to an entry within the organizer database.

21 Claims, 5 Drawing Sheets

METHOD AND APPARATUS FOR LINKING ELECTRONIC INK TO ELECTRONIC PERSONAL INFORMATION SYSTEMS

FIELD OF THE INVENTION

This invention relates generally to electronic writing devices and, more particularly, relates to digitizer devices and the like wherein a user moves a special pen or stylus over a surface of a sensitive tablet for creating strokes of "electronic ink" on a display device.

BACKGROUND OF THE INVENTION

Electronic tablets and digitizer devices are well known and widely used. Typically a user holds a writing implement, such as a pen or stylus that contains electronic circuitry, and then moves a tip of the pen over a surface of an electronic tablet. An output of the tablet, which may be considered to be samples of the pen motion, is indicative of the location, in x-y tablet coordinates, of the tip of the pen. A display device can be used to map digitizer samples to display screen pixel coordinates, and to then connect these pixels by line segments. The result may be considered to be a display of "digital ink" or "electronic ink".

The value of electronic ink to a particular user is determined in large part by how easily the electronic ink can be accessed and retrieved according to various user criteria. One typical, but technically challenging, method for accessing electronic ink is to first translate the ink strokes into text using a handwriting recognition software package, and to then access the electronic ink using conventional text processing operations such as string searching and/or bookmarks. However, many handwriting recognition systems and techniques produce unreliable output, and errors in correctly recognizing strokes can result in some of the electronic ink not being accessible. Also, some of the electronic ink may represent a sketch, a mathematical equation, or some other notation that is not suitable for being translated into text. Relatedly, a textual representation of the electronic ink is not required for many user queries into the electronic ink.

It is also frequently the case that it is desirable to access electronic ink in a similar manner to traditional paper notebooks, by retrieving electronic ink that was written at a certain time or within a certain period of days or weeks. However, and except for the most recently created electronic ink, this process can be very unreliable, as the user may have only a vague recollection of when certain (electronic ink) notes were taken.

OBJECTS AND ADVANTAGES OF THE INVENTION

It is a first object and advantage of this invention to provide a technique to associate, cross-reference and/or link the output of a digitizer-type device to entries maintained by an electronic personal information management tool (PIM tool), such as an electronic calendar, an electronic appointment or organizer book, or an electronic diary.

It is a further object and advantage of the invention to provide an auxiliary mechanism to improve the retrieval time for electronic ink.

It is another object and advantage of the invention to provide a mechanism to improve the overall retrieval accuracy for electronic ink, by not requiring that handwriting recognition be performed on the user-generated strokes.

SUMMARY OF THE INVENTION

The foregoing and other problems are overcome and the objects of the invention are realized by methods and apparatus in accordance with embodiments of this invention.

The teachings of this invention are directed to a method and to an apparatus, as well as to a computer program, for associating digitizer tablet stroke samples with entries of an electronic personal information management (PIM) tool, such as an electronic organizer or an electronic calendar. A stroke database has a plurality of time stamped stroke entries, and a PIM database has a plurality of entries each having a time associated therewith. A controller searches at least one of the stroke database and the PIM database to locate corresponding entries in each database that indicate that a particular one of the stroke entries was created at a time that corresponds to a particular one of the PIM database entries. The controller is responsive to the search being successful for forming a link between the stroke entry and the PIM database entry for enabling corresponding stroke information to be visualized in association with the particular one of the PIM database entries. In accordance with these teachings, and by example, a user is enabled to recall and view handwritten notes and other information that were made during a meeting that corresponds to an entry within the organizer database.

BRIEF DESCRIPTION OF THE DRAWINGS

The above set forth and other features of the invention are made more apparent in the ensuing Detailed Description of the Invention when read in conjunction with the attached Drawings, where:

FIG. 5A illustrates an exemplary set of electronic organizer entries without links to entries in the electronic ink database, while

DETAILED DESCRIPTION OF THE INVENTION

Figure 1:
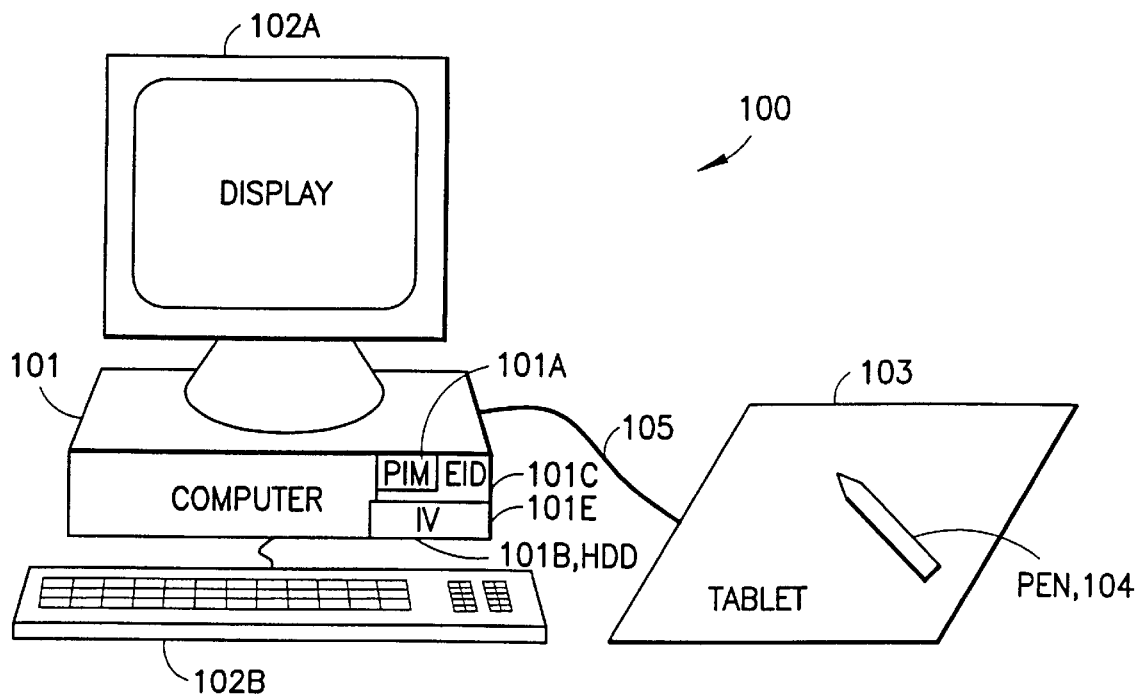
FIG. 1 is simplified block diagram of a computer system that is suitable for practicing this invention.

FIG. 1 illustrates a data processing system 100 that is suitable for practicing this invention. The data processing system 100 includes a computer 101 having a user interface that includes a display 102A and a keyboard 102B. A digitizer tablet 103, having a tethered or an untethered pen 104, is coupled to the computer 101 through a suitable cable 105. A user creates handwriting samples in a conventional manner by moving a tip of the pen 104 across the surface of the tablet 103. The samples can be sent to the computer 101 and then mapped to and displayed on the display 102A. The computer 101 is assumed to include a memory, such as a hard disk drive (HDD 101B) that stores at least one electronic personal information management tool (PIM tool) and its associated database 101A. The PIM tool 101A may be, but is not limited to, an electronic calendar, an electronic appointment book, and electronic personal organizer, or an electronic diary. A feature of the various types of electronic PIM tools 101A is that they have an ability to organize information by date (e.g., day, month, year), and in some cases by time of day as well. The HDD 101B is also assumed to store an electronic ink database (EID) 101C, as well as the operating program(s) that are used to exercise and interact with the PIM tool 101A and the EID 101C, in accordance with the teachings of this invention. One of these programs is an ink viewer (IV) 101E that is associated with the EID 101C, and that enables the stored electronic ink to be placed on the display 102A for viewing by the user.

Figure 2:
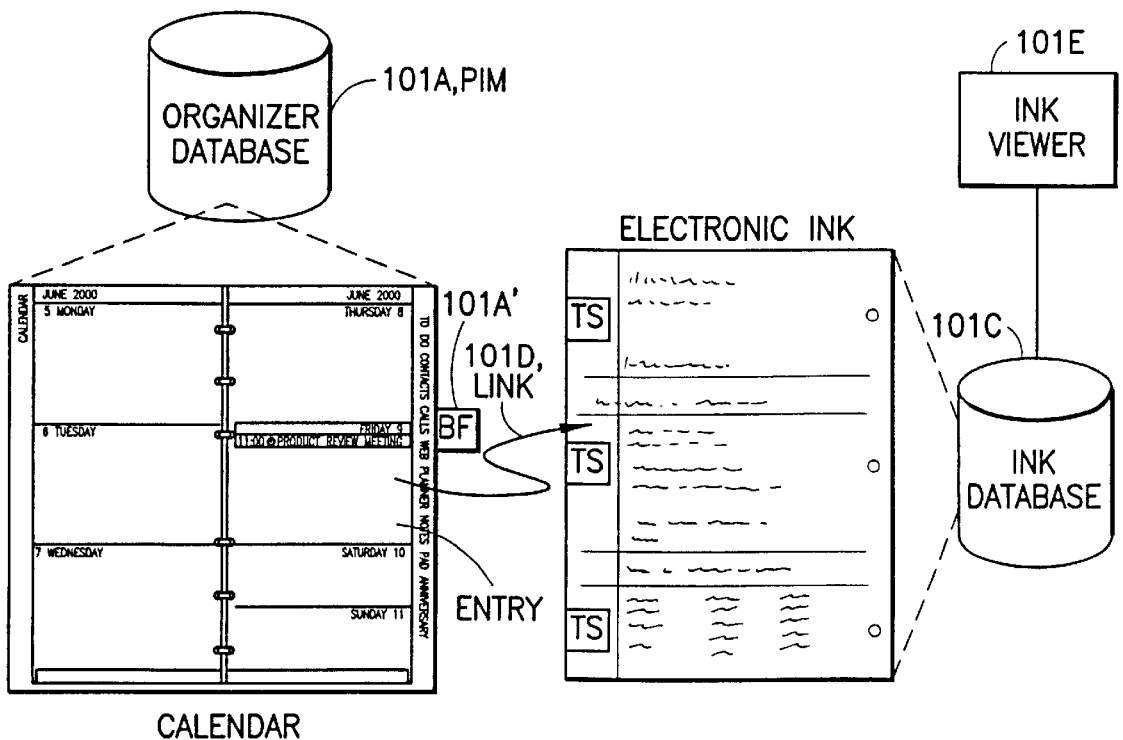
FIG. 2 shows a relationship between an electronic organizer database and an electronic ink database.

An aspect of these teachings forms links 101D between the electronic ink entries stored in the EID 101C and the entries of the electronic personal information management tool (PIM tool) 101A. Individual entries in PIM tool 101A can be linked to external files or applications to establish a logical association between PIM tool database 101A entries and the electronic ink entries stored in the electronic ink database (EID) 101C. This feature is explained in further detail using the example of an appointment in a calendar. A link 101D is established from a particular calendar entry to the electronic ink that was created at the time for which the appointment was scheduled. FIG. 2 illustrates this mechanism in greater detail.

The mechanism used to establish the link 101D between the electronic organizer (PIM tool 101A) and the electronic ink stored in the EID 101C will typically be a function of the specifics of the implementation of the PIM tool 101A (also referred to herein simply for convenience, and not by way of limitation, as an "organizer").

Some known types of organizers support explicit links to external files, e.g., Lotus Organizer™. When following this type of link 101D, an application is executed that is associated with the file that the link 101D points to. In the instant case, the link 101D points to the EID 101C, and to the ink viewer 101E that is associated with the EID 101C.

Other types of organizer applications do not support explicit links to external files, e.g. Microsoft Outlook™. In this case, it is preferred to embed into or otherwise associate a batch file (EF) 101A' with the organizer entry. The batch file 101A' is run by selecting the file, or is run automatically when the entry is opened and viewed, and executes a call to the ink viewer 101E to open the EID 101C at a specified location.

Still referring to FIG. 2, a further aspect of this invention relates to the automatic creation of the links 101D between the PIM tool 101A and the EID 101C. In a presently preferred embodiment a utility program automatically creates the links 101D by matching time stamps (TS) recorded for the electronic ink in the EID 101C against entries in the organizer database 101A.

Figures 3A, 3B:
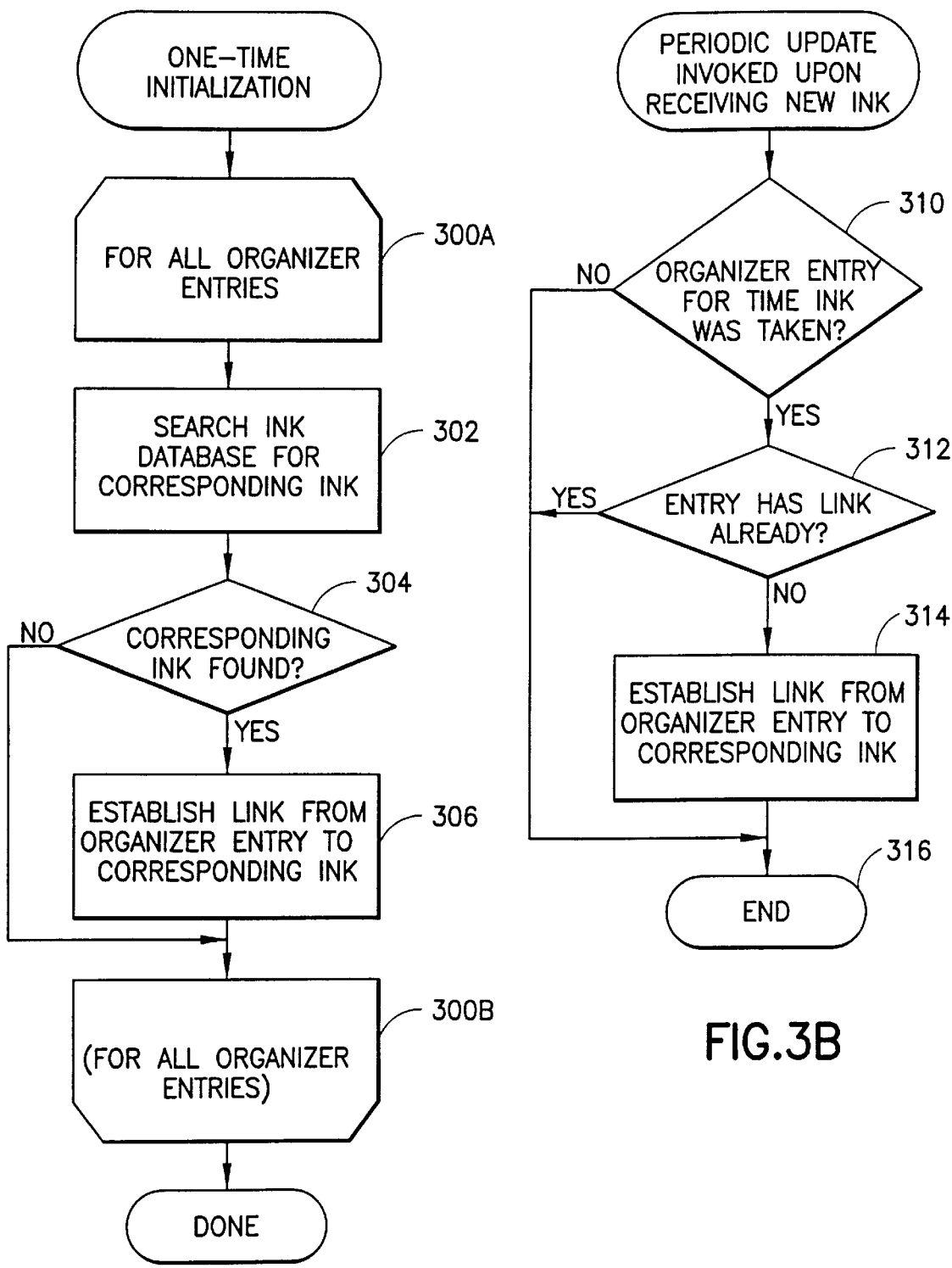
FIGS. 3A and 3B are logic flow diagrams illustrating a technique for automatically establishing links between the electronic organizer database and an electronic ink database of FIG. 2, using one-time initialization (FIG. 3A) and periodic updates (FIG. 3B)

Referring now as well to FIGS. 3A and 3B, the process of automatically establishing links is performed in two steps:
(1) a one-time global cross-referencing step (FIG. 3A) and
(2) a periodic, incremental cross-referencing step (FIG. 3B).

During the one time initialization procedure of FIG. 3A, the entire organizer database 101A is traversed for entries. For every organizer entry (Steps 300A, 300B), the EID 101D is queried for any electronic ink having a time stamp (TS) that indicates the electronic ink was created during the period specified by the organizer entry (Step 302). If corresponding electronic ink is found at Step 304, a link 101D is established that points to the first electronic ink that was created within the specified time interval (Step 306). Once this process is complete, all further links 101D may be established using the incremental update procedure shown in FIG. 3B.

In the case of FIG. 3B, when new electronic ink is received from the digitizer 103, the time stamp (TS) associated with the newly received electronic ink is tested against the organizer database 101A (Step 310). If an entry is found that covers a time span containing the time stamp of the newly received electronic ink, the procedure determines at Step 312 whether the identified organizer entry is already linked to the EID 101C. If a link 101D does not yet exist, a new link 314 is created that points to the newly received electronic ink, which is also stored in the EID 101C. At Step 316 the periodic update procedure terminates for the newly received electronic ink.

The one time initialization procedure (FIG. 3A) and the periodic update procedure (FIG. 3B) described above can be varied in a number of ways.

For example, instead of invoking the periodic (incremental) update procedure of FIG. 3B for every upload of electronic ink from the tablet 103, the procedure may instead be invoked after some predetermined number of new electronic ink uploads. This approach serves to reduce the data processing load on the computer 101.

Similarly, the periodic (incremental) update procedure of FIG. 3B may be invoked only when a certain amount of ink (e.g., measured in kBytes) has been uploaded.

Further by example, instead of using the periodic (incremental) update procedure of FIG. 3B, that is invoked each time new electronic ink is received (or that is started based on some other criterion, as just explained), the automatic creation of links 101D can be performed by a background process (daemon). In this embodiment the daemon is activated periodically and checks the EID 101C for any new electronic ink, and also checks the PIM database 101A for any new organizer entries (i.e., new since the last time the daemon was invoked).

It may often be the case that electronic ink that is related to an organizer entry (e.g., an appointment) was created at a time other than the exact time period specified by the organizer entry. In order to account for such uncertainties a time interval may be used, where appropriate, that extends the time interval for which the electronic ink in the EID 101C is searched. For example, if an appointment is scheduled for the time period from 10:00 AM to 11:00 AM, all electronic ink created between, for example, 9:45 AM and 11:15 AM may be linked to the appointment. This assumes that there are not other appointments scheduled during the extended overlap periods. If, for example, another appointment was scheduled from 11:00 am to 12:00 pm, then only the time before the first appointment may be extended (e.g., to 9:45 am). The length of the time extension buffer could be made user-selectable.

As an alternative to, or in addition to, creating links 101D between organizer entries and electronic ink, links may be established for every day for which any electronic ink exists. This technique beneficially handles the case where electronic ink may be have been recorded on a day and/or a time of day for which there are no entries in the PIM 101A. A flow diagram illustrating this procedure is shown in FIGS. 4A and 4B.

Figures 4A, 4B:
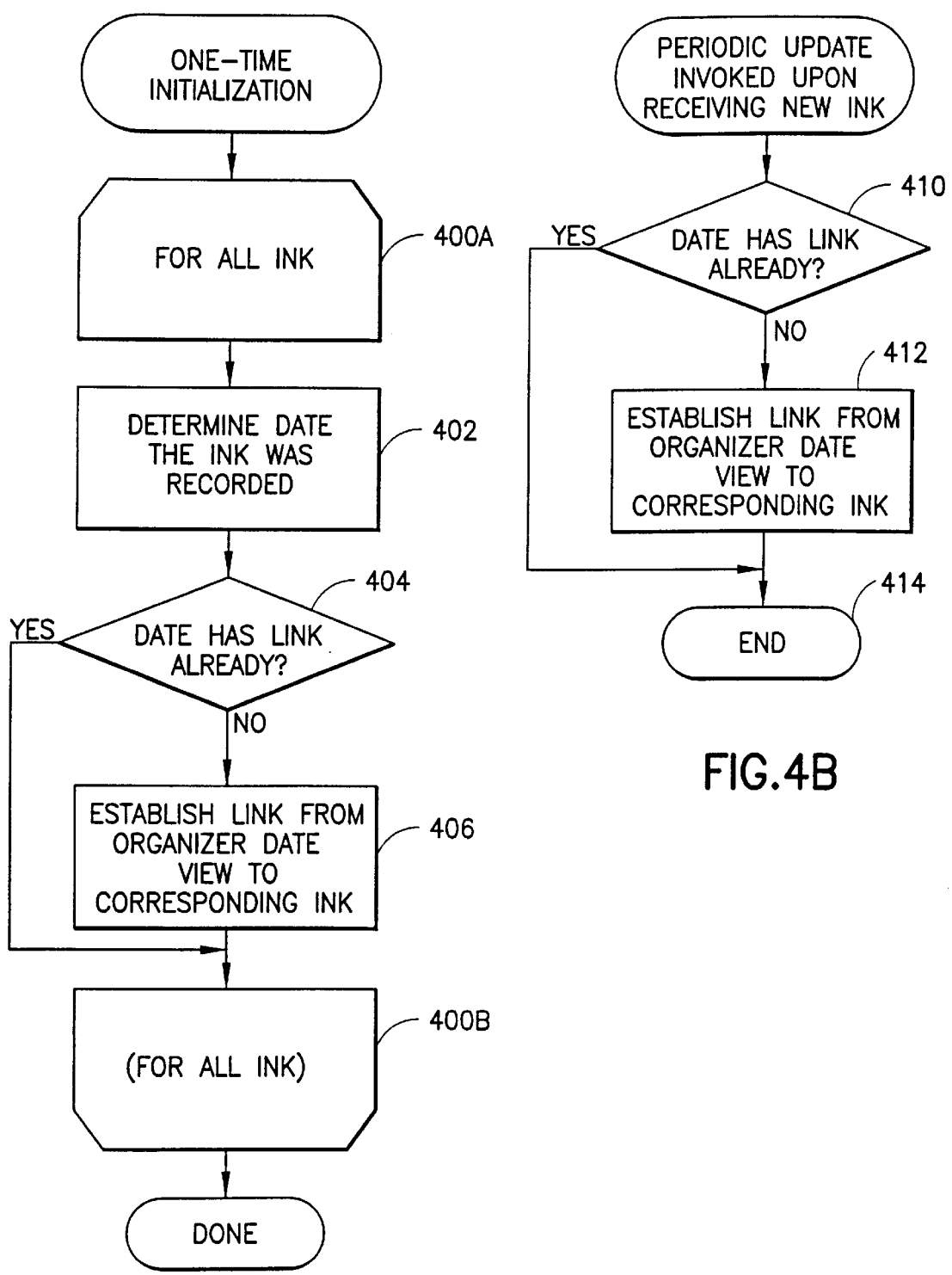
FIGS. 4A and 4B are logic flow diagrams illustrating a technique for automatically establishing links between dates on which electronic ink was created and corresponding date entries in an electronic organizer database, using one-time initialization (FIG. 4A) and periodic updates (FIG. 4B)

During the one time initialization procedure of FIG. 4A, the entire electronic ink database 101C is traversed for electronic ink entries. For every electronic ink entry (Steps 400A, 400B), the date (and optionally time) that the electronic ink was recorded is determined (Step 402), and at Step 404 a determination is made as to whether the ink recordal date has already been linked to an entry in the organizer database 101A. If no link 101D is found to exist, a link is established from the organizer date (and time) that corresponds to the time stamp (TS) of the electronic ink entry in the EID 101C. Once this process is complete, further links 101D may be established using the incremental update procedure shown in FIG. 4B.

In the case of the periodic update procedure of FIG. 4B, when new electronic ink is received from the digitizer 103, the time stamp (TS) associated with the newly received electronic ink is tested to determine if a link 101D already exists. If a link 101D does not exist, a new link (Step 412) is created between the organizer date view to the corresponding newly received electronic ink. At Step 414 the periodic update procedure terminates for the newly received electronic ink.

As with the case of FIGS. 3A and 3B, a number of modifications can be made to the procedures depicted in FIGS. 4A and 4B. For example, the periodic (incremental) update procedure of FIG. 4B can be invoked after some number of new electronic ink uploads, or after some predetermined amount of electronic ink is received (e.g., again measured in, for example, kBytes). A background update process (daemon) can also be activated periodically, instead of invoking the periodic update process upon the occurrence of some event, or some criterion being satisfied.

It should be understood that the procedures depicted in FIGS. 3A and 3B, and in FIGS. 4A and 4B, can be used separately or in combination.

Figure 5A:
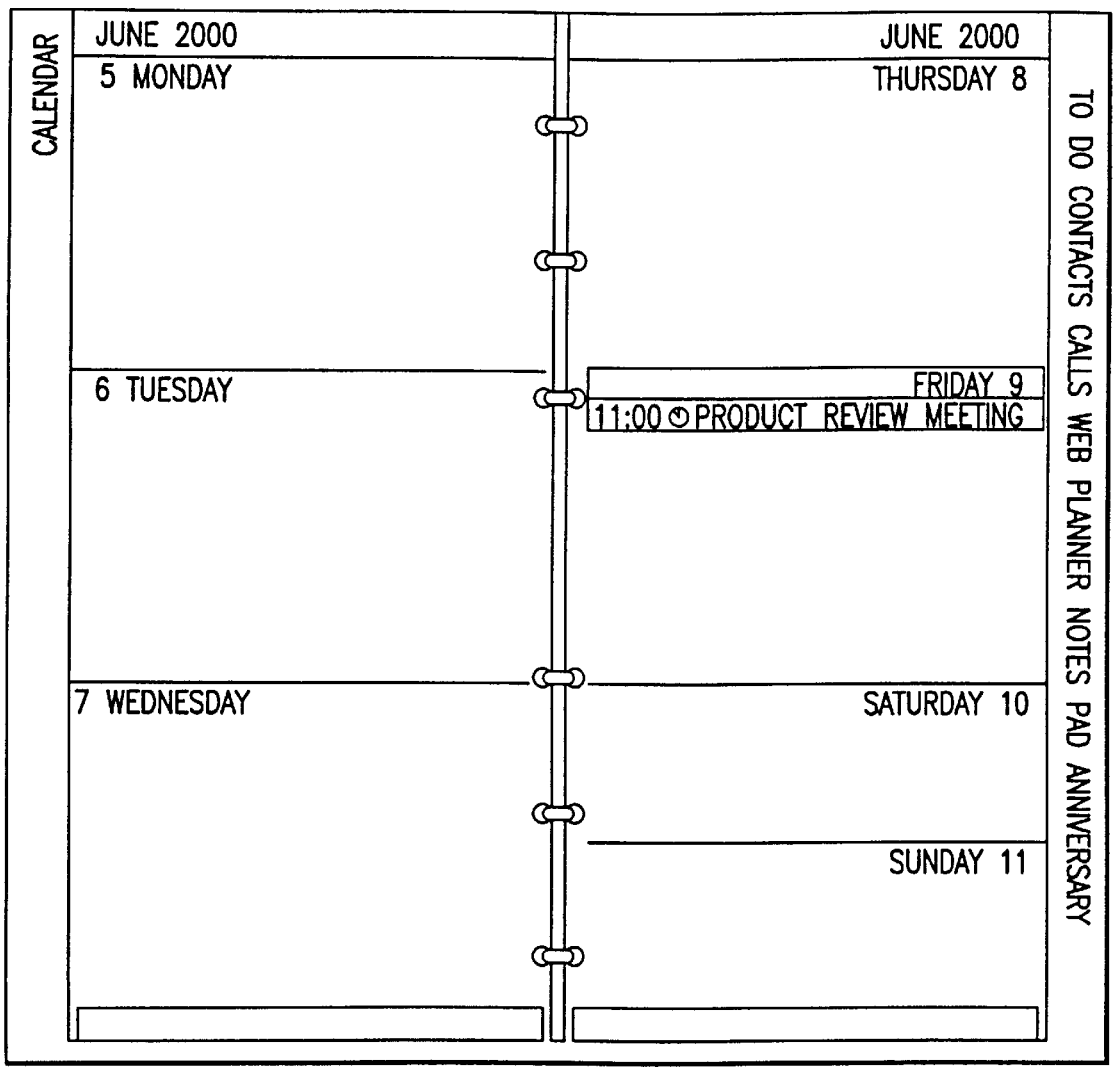
Figure 5B:
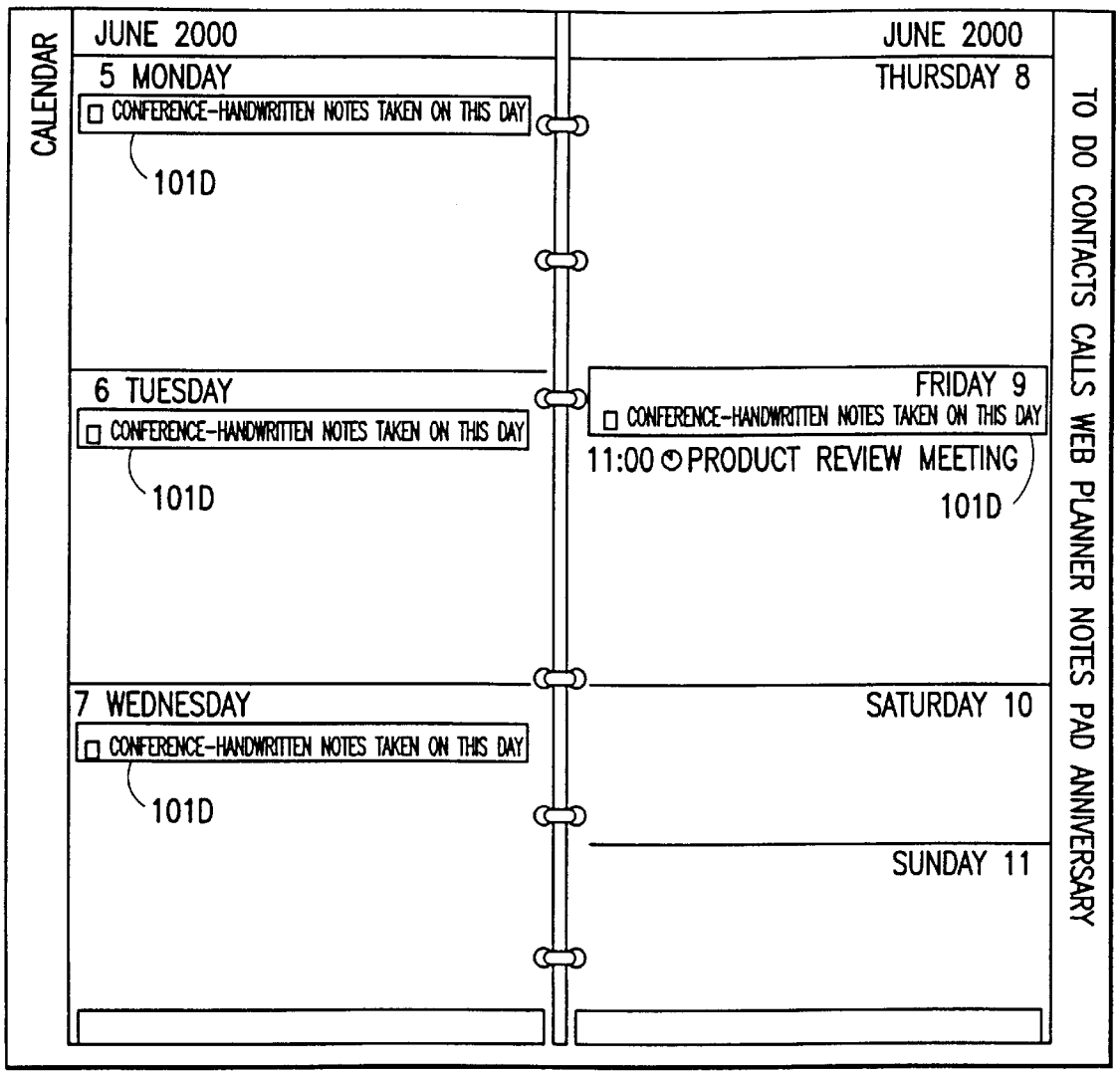
FIG. 5B illustrates an exemplary set of electronic organizer entries with links to entries in the electronic ink database, in accordance with the teachings herein.

FIG. 5A illustrates an exemplary set of electronic organizer entries (displayed on display 102A) from the PIM 101A without links to entries in the electronic ink database 101C, while FIG. 5B illustrates an exemplary set of electronic organizer entries with links 101D to entries in the electronic ink database 101C, in accordance with these teachings. As an example, the user may employ a pointing device to select one of the links 101D. In response, the ink viewer 101E is activated to retrieve the pointed-to entry in the electronic ink database 101C, and to display the corresponding electronic ink (e.g., handwritten notes taken at a conference) on the display 102A.

Based on the foregoing description it can be appreciated that an aspect of these teachings is a computer program embodied on a computer-readable medium, such as the HDD 101B, where the program has code segments for associating digitizer tablet 103 stroke samples with entries in the database 101A of the electronic personal information management (PIM) tool. A stroke database 101C has a plurality of time stamped stroke entries and the PIM database 101A has a plurality of entries each having a time associated therewith. At least one of the code segments searches at least one of the stroke database 101C and the PIM database 101A to locate corresponding entries in each database that indicate that a particular one of the stroke entries was created at a time that corresponds to a particular one of the PIM database entries. At least one other one of the program code segments is responsive to the search being successful for forming the link 101D between the stroke entry and the PIM database entry, thereby enabling corresponding stroke information to be visualized on the display 102A in association with the particular one of the PIM database entries.

It should be appreciated that in some embodiments of these teachings the PIM 101A may be resident on one computer, and the electronic ink database 101C may be resident on another computer. Furthermore, the PIM database 101A may be resident in a handheld device, such as a portable electronic organizer device, and a suitable communication link, such as a wired cable or a wireless optical or RF communication link may be provided between the handheld device and the computer 101 on which the EID 101C is stored. Through the communication link either a controller in the handheld device or a controller in the computer 101 is enabled to search the database(s) and form the links between organizer entries and the stroke entries in the EID 101C. The display 102A or a display of the handheld organizer device is thereafter enabled to display the desired stroke information associated with a particular organizer entry.

Thus, while the invention has been particularly shown and described with respect to preferred embodiments thereof, it will be understood by those skilled in the art that changes in form and details may be made therein without departing from the scope and spirit of the invention.

What is claimed is:

1. A method for associating an output of an electronic tablet with entries of an electronic personal information management tool, comprising steps of:

storing the output of the electronic tablet into a tablet database, the stored output being time stamped to indicate a time when the output was created; and for a particular entry of the electronic personal information management tool, the entry having a time associated therewith, searching the tablet database to locate any stored output of the electronic tablet that is time stamped with a time that indicates that the electronic tablet generated output during the time associated with the entry and, if the search is successful, forming a link between the particular entry and the stored output of the electronic tablet.

2. A method as in claim 1, and further comprising a step of invoking a viewer to visualize the stored output of the electronic tablet, to which the link has been formed.

3. A method as in claim 1, wherein the step of searching the tablet database searches for a time stamp having a time that lies within a range of times associated with the entry.

4. A method as in claim 1, wherein the range of times extends before and after a time associated with the entry.

5. A method as in claim 1, wherein the range of times extends before and after a time period associated with the entry.

6. A method as in claim 1, wherein the range of times extends at least one of before and after a time period associated with the entry.

7. A method as in claim 2, wherein the step of invoking the viewer is executed by the link pointing to the viewer.

8. A method as in claim 2, wherein the step of invoking the viewer is executed by first invoking a file that is associated with the entry, the file calling the viewer.

9. A method as in claim 1, and further comprising a step of periodically updating links between entries and the stored output of the electronic tablet.

10. A method as in claim 9, wherein the step of updating is executed in response to at least one predetermined criterion being met.

11. A method as in claim 10, wherein the at least one predetermined criterion step is an arrival of new output from the electronic tablet.

12. A method as in claim 10, wherein the at least one predetermined criterion step is an arrival of a predetermined amount of new output from the electronic tablet.

13. A method as in claim 9, wherein the step of updating is executed as a background process.

14. A method for associating an output of an electronic tablet with entries of an electronic personal information management tool, comprising steps of:

storing the output of the electronic tablet into a tablet database as a tablet entry, each tablet entry being time stamped to indicate a time when the output was created; and for a particular tablet entry, searching a database of entries of the electronic personal information management tool, each entry having a time associated therewith, to locate an entry having a time that corresponds to the time stamp of the tablet entry and, if the search is successful, forming a link between the tablet entry and the entry having a time that corresponds to the time stamp of the tablet entry.

15. A method as in claim 14, and further comprising a step of periodically updating links between tablet entries and the entries of the electronic personal information management tool.

16. A method as in claim 15, wherein the step of updating is executed in response to at least one predetermined criterion being met.

17. A method as in claim 16, wherein the at least one predetermined criterion step is an arrival of new output from the electronic tablet.

18. A method as in claim 16, wherein the at least one predetermined criterion step is an arrival of a predetermined amount of new output from the electronic tablet.

19. A method as in claim 15, wherein the step of updating is executed as a background process.

20. Apparatus for associating digitizer tablet stroke samples with entries of an electronic personal information management (PIM) tool, comprising a stroke database having a plurality of time stamped stroke entries, a PIM database having a plurality of entries each having a time associated therewith, and a controller for searching at least one of the stroke database and the PIM database to locate corresponding entries in each database that indicate that a particular one of the stroke entries was created at a time that corresponds to a particular one of the PIM database entries, said controller being responsive to the search being successful for forming a link between the stroke entry and the PIM database entry for enabling corresponding stroke information to be visualized in association with the particular one of the PIM database entries.

21. A computer program embodied on a computer-readable medium, said program comprising code segments for associating digitizer tablet stroke samples with entries of an electronic personal information management (PIM) tool, wherein a stroke database has a plurality of time stamped stroke entries and a PIM database has a plurality of entries each having a time associated therewith, wherein at least one of said code segments searches at least one of the stroke database and the PIM database to locate corresponding entries in each database that indicate that a particular one of the stroke entries was created at a time that corresponds to a particular one of the PIM database entries, and wherein at least one other one of said code segments searches is responsive to the search being successful for forming a link between the stroke entry and the PIM database entry for enabling corresponding stroke information to be visualized in association with the particular one of the PIM database entries.

* * * * *